US012801521B2

(12) United States Patent
Yuan et al.

(10) Patent No.: US 12,801,521 B2
(45) Date of Patent: Nov. 17, 2026

(54) MEMORY MANAGEMENT METHOD, SYSTEM, AND RELATED APPARATUS

(71) Applicant: HUAWEI TECHNOLOGIES CO., LTD., Shenzhen (CN)

(72) Inventors: Hui Yuan, Beijing (CN); Kun Xue, Shenzhen (CN); Fei Ding, Nanjing (CN); Ning Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/786,772

(22) Filed: Jul. 29, 2024

(65) Prior Publication Data

US 2024/0385957 A1 Nov. 21, 2024

Related U.S. Application Data

(63) Continuation of application No. PCT/CN2023/070589, filed on Jan. 5, 2023.

(30) Foreign Application Priority Data

Jan. 30, 2022 (CN) ......................... 202210114330.8

(51) Int. Cl.
*G06F 12/02* (2006.01)

(52) U.S. Cl.
CPC .................................. *G06F 12/023* (2013.01)

(58) Field of Classification Search
CPC .................................................... G06F 12/023
See application file for complete search history.

(56) References Cited

U.S. PATENT DOCUMENTS

2017/0149890 A1* 5/2017 Shamis ............... H04L 67/1097
2020/0322287 A1* 10/2020 Connor ................. H04L 49/356
2022/0222118 A1* 7/2022 Wang .................... G06F 9/5016
2022/0237113 A1* 7/2022 Woo .................... G06F 12/0882
2022/0398199 A1* 12/2022 Calciu .................. G06F 9/5016

FOREIGN PATENT DOCUMENTS

CN 101158927 A 4/2008
CN 112231101 A 1/2021

OTHER PUBLICATIONS

International Search Report and Written Opinion issued in PCT/CN2023/070589, dated Feb. 20, 2023, 9 pages.

* cited by examiner

*Primary Examiner* — Kaushikkumar M Patel
*Assistant Examiner* — Christian Joseph O'Connell

(57) ABSTRACT

The technology of this application relates to a memory management method, a system, and a related apparatus, and the technology is applied to the field of data processing. Specifically, in a memory management process, when a host has a memory requirement, the host sends a memory request message to a network device, and the network device sends an indication message to the host based on the memory request message, to indicate the host to use a free memory of the network device and/or a free memory of a memory providing device.

20 Claims, 6 Drawing Sheets

MEMORY MANAGEMENT METHOD, SYSTEM, AND RELATED APPARATUS

CROSS-REFERENCE TO RELATED APPLICATIONS

This application is a continuation of International Application No. PCT/CN2023/070589 filed on Jan. 5, 2023, which claims priority to Chinese Patent Application No. 202210114330.8 filed on Jan. 30, 2022. The disclosures of the aforementioned applications are hereby incorporated by reference in their entireties.

TECHNICAL FIELD

This application relates to the field of data processing, and in particular, to a memory management method, a system, and a related apparatus.

BACKGROUND

A disaggregated data center (DDC) may use remote direct memory access (RDMA), so that memory data generated by an application of a server can be stored in a remote memory in a memory pool.

A current memory pool includes a local memory provided by each server in a data center, and memory data generated by an application of a server needs to be stored in a local memory of the server, so that the application is normally run. However, if the local memory of the server cannot successfully store the memory data of the server, the memory data of the server needs to be stored in a remote memory in the memory pool, where the remote memory includes a local memory provided by another server.

In the foregoing memory allocation solution, memories available for allocation are local memories provided by servers. Each server needs a large memory for running, and a small memory can be provided for another server for use. As a result, a memory available for allocation in the foregoing allocation solution is excessively small.

SUMMARY

This disclosure provides a memory management method, a system, and a related apparatus, to expand a memory available for allocation.

A first aspect of this disclosure provides a memory management method. The method includes the following steps.

In a data center network, when a host has a memory requirement, the host may request, to a network device directly connected to the host, to use a remote memory. The network device may receive a memory request message sent by the host. The host applies for the remote memory by using the memory request message. The remote memory is provided by a device other than the host.

After receiving the memory request message, the network device determines whether a free memory is greater than or equal to the remote memory requested by using the memory request message. If the network device determines that the free memory is greater than or equal to the remote memory requested by using a first memory request message, the network device sends an indication message to the host. The indication message may indicate the host to use the free memory, and the network device and/or a memory providing device may provide the free memory.

In this disclosure, in addition to a local memory provided by each server, memories available for allocation further include a memory provided by the network device, and the memories available for allocation are large.

Based on the first aspect of this disclosure, in a first implementation of the first aspect of this disclosure, when the network device allocates the free memory to the host, a delay requirement of the host can be met. Specifically, the memory request message sent by the host carries a first delay. The first delay indicates that a delay generated when the host uses the remote memory should be less than or equal to a preset value. The network device may estimate, before sending the indication message, a second delay generated when the host uses the free memory.

If the network device determines that the second delay is less than or equal to the first delay, the network device determines that the free memory meets the delay requirement of the host. In this case the network device sends the indication message to the host.

In this disclosure, when the network device allocates the free memory to the host, a size of the free memory can meet not only a size requirement of the host on the requested memory, but also a delay requirement of the host on the requested memory.

Based on the first aspect of this disclosure and the first implementation of the first aspect of this disclosure, in a second implementation of the first aspect of this disclosure, the network device may preferentially allocate a free memory of the network device to the host. Specifically, the free memory includes a first free memory provided by the network device and a second free memory provided by a first memory providing device. If the network device determines that the first free memory is greater than the remote memory requested by the host, regardless of a size relationship between the second free memory and the remote memory requested by the host, the indication message sent by the network device indicates the host to use the first free memory.

In this disclosure, if the free memory of the network device directly connected to the host is greater than or equal to the remote memory requested by the host, the network device preferentially allocates the free memory of the network device to the host, to reduce, as much as possible, a delay generated when the host uses the free memory.

Based on the first aspect of this disclosure and the first implementation of the first aspect of this disclosure, in a third implementation of the first aspect of this disclosure, when a free memory of the network device is insufficient, but a free memory of a first memory providing device directly connected to the network device is sufficient, the network device may preferentially allocate the free memory of the first memory providing device to the host. Specifically, the free memory includes a first free memory provided by the network device and a second free memory provided by the first memory providing device. The first memory providing device is directly connected to the network device. If the network device determines that the first free memory is less than the remote memory requested by the host, and the second free memory is greater than or equal to the remote memory requested by the host, the indication message sent by the network device may indicate the host to use the second free memory.

In this disclosure, if the free memory of the network device directly connected to the host is less than the remote memory requested by the host, and the free memory of the first memory providing device directly connected to the network device is greater than or equal to the remote memory requested by the host, the network device preferentially allocates the free memory of the first memory providing device to the host, to reduce, as much as possible, a delay generated when the host uses the free memory.

Based on the third implementation of the first aspect of this disclosure, in a fourth implementation of the first aspect of this disclosure, the network device may determine a size of the free memory of the memory providing device based on attribute information of the memory providing device. Specifically, before receiving the memory request message from the host, the network device may receive first attribute information sent by the first memory providing device, where the first attribute information includes a size of the second free memory of the first memory providing device. The network device may determine, based on the first attribute information, a size relationship between the second free memory and the remote memory requested by the host. The indication message sent by the network device to the host carries an address of the first memory providing device and an address of the second free memory.

In this disclosure, the network device may determine the size of the free memory of the memory providing device based on the attribute information sent by the memory providing device, so that feasibility of this solution is improved.

Based on the first aspect of this disclosure and the first implementation of the first aspect of this disclosure, in a fifth implementation of the first aspect of this disclosure, when both a free memory of the network device and a free memory of a first memory providing device directly connected to the network device are insufficient, but a free memory of a second memory providing device directly connected to the another network device is sufficient, the network device may allocate the free memory of the second memory providing device to the host. Specifically, the free memory includes a first free memory provided by the network device, a second free memory provided by the first memory providing device, and a third free memory provided by the second memory providing device. If the network device determines that both the first free memory and the second free memory are less than the remote memory requested by the host, and the third free memory is greater than or equal to the remote memory requested by the host, the indication message sent by the network device may indicate the host to use the third free memory.

In this disclosure, when both the free memory of the network device and the free memory of the first memory providing device are insufficient, the network device may allocate the free memory of the second memory providing device to the host, to ensure that the host can use the remote memory.

Based on the fifth implementation of the first aspect of this disclosure, in a sixth implementation of the first aspect of this disclosure, the network device may determine a size of the free memory of the memory providing device based on attribute information of the memory providing device. Specifically, before receiving the memory request message from the host, the network device may receive first attribute information sent by the first memory providing device and second attribute information sent by the second memory providing device. The first attribute information includes a size of the second free memory of the first memory providing device, and the second attribute information includes a size of the third free memory of the second memory providing device. The network device may determine, based on the first attribute information, a size relationship between the second free memory and the remote memory requested by the host, and may determine, based on the second attribute information, a size relationship between the third free memory and the remote memory requested by the host. The indication message sent by the network device to the host carries an address of the second memory providing device and an address of the third free memory.

In this disclosure, the network device may determine the size of the free memory of the memory providing device based on the attribute information sent by the memory providing device, so that feasibility of this solution is improved.

Based on the fifth implementation of the first aspect of this disclosure, in a seventh implementation of the first aspect of this disclosure, the network device receives attribute information of the second memory providing device by using a memory controller. Specifically, after receiving the memory request message from the host, the network device forwards the memory request message to the memory controller. The memory controller may be independent of the network device, and the memory controller and the network device belong to a same device cluster.

The network device receives third attribute information sent by the memory controller. The third attribute information is generated by the memory controller based on the memory request message and attribute information reported by the second memory providing device to the memory controller. The third attribute information includes an address of the second memory providing device and an address of the third free memory.

In this disclosure, the network device may obtain the third attribute information of the second memory providing device by using the memory controller. The third attribute information includes the address of the second memory providing device and the address of the free memory of the second memory providing device. Therefore, the network device can directly indicate, based on the third attribute information, the host to use the free memory of the second memory providing device, so that processing load of the network device is reduced, and efficiency of memory allocation is improved.

Based on the first aspect of this disclosure and any one of the first implementation to the seventh implementation of the first aspect of this disclosure, in an eighth implementation of the first aspect of this disclosure, the network device may terminate a message. Specifically, before the network device receives the memory request message from the host, a first connection is established between the network device and the host. The network device establishes communication with the host through the first connection, to exchange information. The network device may terminate, through the first connection, a message sent by the host.

In this disclosure, the network device has a capability of terminating the message, and the capability is implemented by establishing a connection to the host, so that the feasibility of this solution is improved.

Based on the sixth implementation of the first aspect of this disclosure, in a ninth implementation of the first aspect of this disclosure, the network device may terminate a message. Specifically, before receiving the memory request message from the host, a second connection is established between the network device and a target memory providing device. The network device establishes communication with the target memory providing device through the second connection, to exchange information. The network device may terminate, through the second connection, a message sent by the target memory providing device. The target providing device includes the first memory providing device or the second memory providing device.

In this disclosure, the network device has a capability of terminating the message, and the capability is implemented by establishing a connection to the target memory providing device, so that the feasibility of this solution is improved.

Based on the eighth implementation or the ninth implementation of the first aspect of this disclosure, in a tenth implementation of the first aspect of this disclosure, the first connection and/or the second connection are/is established based on any one of a remote direct memory access protocol, a transmission control protocol, a high-speed serial computer extended bus standard protocol, and a compute express link protocol.

In this disclosure, a manner of establishing the first connection and the second connection is limited, so that the feasibility of this solution is improved.

Based on the first aspect of this disclosure and any one of the first implementation to the tenth implementation of the first aspect of this disclosure, in an eleventh implementation of the first aspect of this disclosure, the network device includes a switch or a data processing unit, the host includes a server, and the memory providing device includes a server.

In this disclosure, specific forms of the devices are limited, so that the feasibility of this solution is improved.

A second aspect of this disclosure provides a memory management method. The method includes the following steps.

In a data center network, when a host has a memory requirement, the host may request, to a network device directly connected to the host, to use a remote memory. The host may send a memory request message to the network device. The host applies for the remote memory by using the memory request message. The remote memory is provided by a device other than the host.

After sending the memory request message to the network device, the host may receive an indication message from the network device. The indication message is sent by the network device after the network device determines a free memory based on the memory request message, and the free memory is provided by the network device and/or a memory providing device.

The host determines the free memory based on the indication message, and uses the free memory.

In this disclosure, in addition to local memories provided by a first server and a second server in a memory pool, objects of memory allocation further include a memory provided by the network device, and memories available for allocation are large.

Based on the second aspect of this disclosure, in a first implementation of the second aspect of this disclosure, when a first free memory of the network device is greater than or equal to the remote memory requested by the host, the indication message may indicate the host to use the first free memory. Alternatively, when a second free memory of a first memory providing device is greater than or equal to the remote memory requested by the host, the indication message may indicate the host to use the second free memory.

In this disclosure, the free memory indicated by the indication message is limited, so that feasibility of this solution is improved.

Based on the second aspect of this disclosure and the first implementation of the second aspect of this disclosure, in a second implementation of the second aspect of this disclosure, the host has a trigger condition for sending the memory request message. Specifically, before the host sends the memory request message to the network device, if it is determined that a free memory of the host is less than or equal to a preset value, the host determines that a preset condition is met. In this case, the step of sending the memory request message by the host is triggered.

In this disclosure, the host may send the memory request message to the network device when the local free memory is insufficient, so that the feasibility of this solution is improved.

Based on the second aspect of this disclosure and the first implementation or the second implementation of the second aspect of this disclosure, in a third implementation of the second aspect of this disclosure, the host includes a server, the network device includes a switch or a data processing unit, and the memory providing device includes a server.

In this disclosure, specific forms of the devices are limited, so that the feasibility of this solution is improved.

A third aspect of this disclosure provides a network device, including:

- a receiving unit, configured to, receive a memory request message from a host, where the memory request message is for requesting to use a remote memory; receive third attribute information from a memory controller, where the third attribute information includes an address of a second memory providing device and an address of a third free memory; and receive first attribute information from a first memory providing device, where the first attribute information includes a size of a second free memory, and an indication message includes an address of the first memory providing device and an address of the second free memory; and receive the first attribute information from a first memory providing device, where the first attribute information includes a size of a second free memory, and an indication message includes an address of the first memory providing device and an address of the second free memory; and
- a sending unit, configured to: when a free memory is greater than or equal to the remote memory, send the indication message to the host, where the indication message indicates the host to use the free memory, the free memory includes a free memory of the network device and/or a free memory of a memory providing device, and when a second delay is less than or equal to a first delay, the indication message is sent to the host.

The network device provided in the second aspect of this disclosure is configured to perform the method in the first aspect.

A fourth aspect of this disclosure provides a host, including:

- a sending unit, configured to send a memory request message to a network device, where the memory request message is for requesting to use a remote memory;
- a receiving unit, configured to receive an indication message from the network device, where the indication message indicates the host to use a free memory, the free memory includes a free memory of the network device and/or a free memory of a memory providing device, and the free memory is greater than or equal to the remote memory; and
- a processing unit, configured to use the free memory based on the indication message, and determine that a preset condition is met, where the preset condition is that a free memory of the host is less than or equal to a preset value.

The host provided in the fourth aspect of this disclosure is configured to perform the method in the second aspect.

A fifth aspect of this disclosure provides a network device, including:

a processor, a storage, and a transceiver, where the processor is separately connected to the storage and the transceiver; and the processor is configured to obtain instructions stored in the storage, to perform the method in the first aspect.

A sixth aspect of this disclosure provides a host, including:

a processor, a storage, and a transceiver, where the processor is separately connected to the storage and the transceiver; and the processor is configured to obtain instructions stored in the storage, to perform the method in the second aspect.

A seventh aspect of this disclosure provides a system, including a network device and a host connected to the network device, where the network device is configured to perform the method in the first aspect, and the host is configured to perform the method in the second aspect.

An eighth aspect of this disclosure provides a computer readable and writable storage medium, where the computer readable and writable storage medium includes instructions. When the instructions are run on a computer, the computer is enabled to perform the method in the first aspect or the second aspect.

A ninth aspect of this disclosure provides a computer program product including instructions. When the computer program product runs on a computer, the computer is enabled to perform the method in the first aspect or the second aspect.

A tenth aspect of this disclosure provides a chip system. The chip system includes at least one processor and a communication interface, and the communication interface and the at least one processor are interconnected by using a line. The at least one processor is configured to run a computer program or instructions, to perform the method in the first aspect or the second aspect.

DESCRIPTION OF EMBODIMENTS

Embodiments of this disclosure provide a memory management method, a system, and a related apparatus, to expand memories available for allocation.

Figure 1:
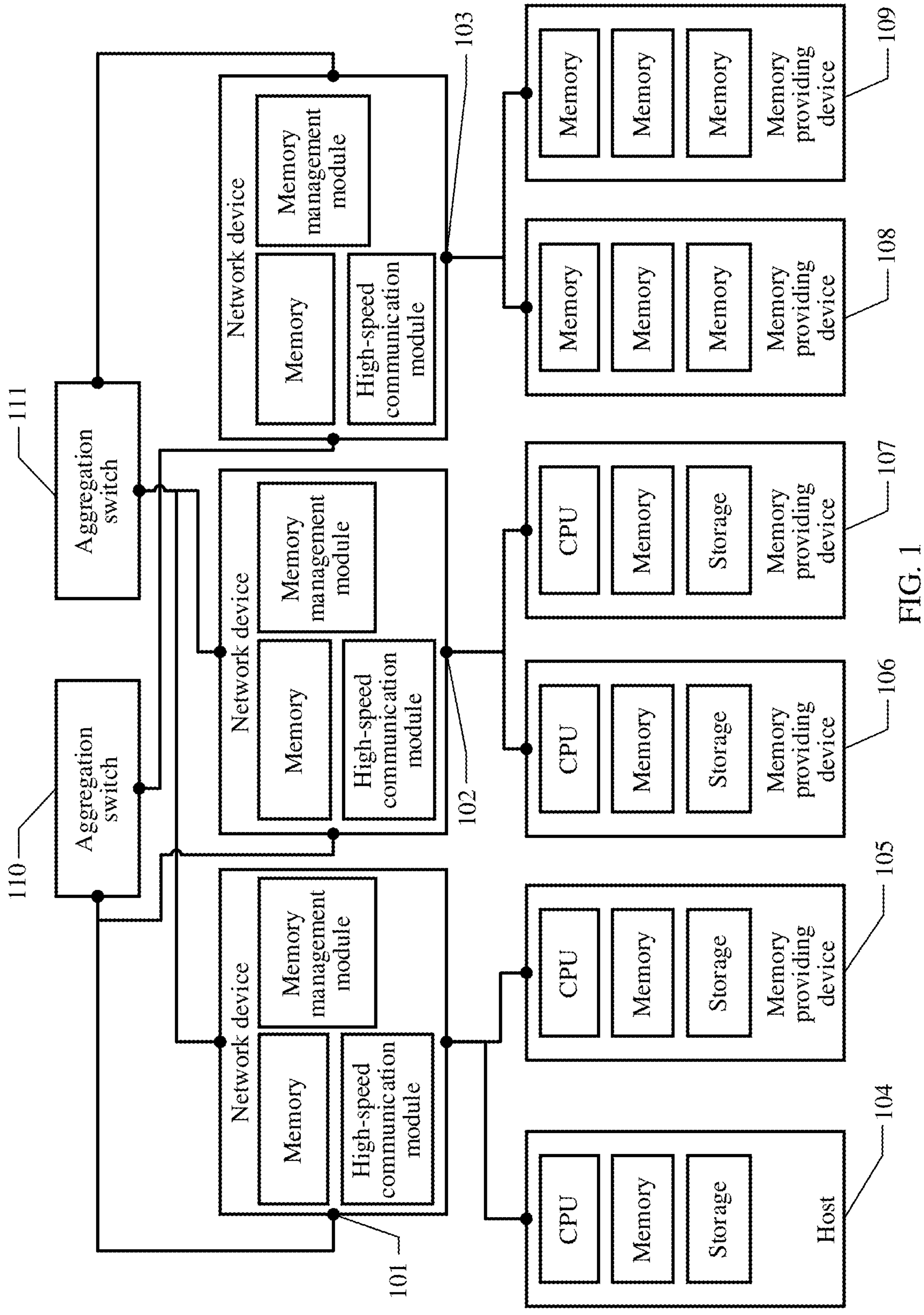
FIG. 1 is a schematic diagram of an architecture of a memory management system according to an example embodiment of this disclosure.

Refer to FIG. 1. A memory management system in an embodiment of this disclosure includes: network devices 101 to 103, a host 104, memory providing devices 105 to 109, and aggregation switches 110 and 111.

In a conventional technology, a memory pool in the memory management system includes free memories provided by the memory providing devices 105 to 109. In this embodiment of this disclosure, the existing memory pool is extended, and a large memory is provided in the network devices 101 to 103. A logical memory pool in this embodiment of this disclosure includes free memories provided by the network devices 101 to 103 and the free memories provided by the memory providing devices 105 to 109. Both the foregoing two types of memories belong to remote memories relative to the host 104 that serves as a memory demander. The host and the memory providing device access a network by using the network device. A quantity of hosts connected to the network device is not limited, and a quantity of memory providing devices connected to the network device is not limited.

The network device 101 is used as an example. The network device 101 is connected to the host 104 and the memory providing device 105. The network device 101 may be deployed on a rack. A point of delivery (POD) is an upper-level concept of the rack. The aggregation switch 110 is used as an example. One POD includes the aggregation switch 110, the network devices 101 to 103 connected to the aggregation switch 110, and the host and the memory providing devices that are connected to the network devices 101 to 103. A quantity of network devices connected to the aggregation switch is not limited. For connection forms between the network device 102 and the network device 103 and each device, refer to the network device 101.

To expand the existing memory pool, in this embodiment of this disclosure, a large memory is provided in the network device. Specifically, a large memory interface is provided in the network device, so that the network device can provide a memory, and the memory provided by the network device enters the memory pool to participate in memory allocation.

In this embodiment of this disclosure, a memory management module is added to the network device. The module includes a network-level memory controller (MC), so that the network device can perform a memory management task in the memory management system, manage a memory of the host and a memory of the memory providing device, and allocate a memory to the host. To enable the network device to directly exchange data with the host and the memory providing device, a high-speed communication module is further added to the network device in this embodiment of this disclosure, so that the network device terminates a communication protocol between the network device and each of the host and the memory providing device, and the network device can manage the memory of the host and the memory of the memory providing device.

The network devices 101 to 103 include a switch, a data processing unit, or another network device with a switching function, and can simultaneously serve as a memory management device and a memory providing device, to manage and allocate a memory in the memory pool. The host 104 includes a general-purpose server or another device with a computing function. As the memory demander, the host 104 requests a memory from the network device. The memory providing devices 105 to 109 include hosts, general-purpose servers, or memory servers. As memory providers, the memory providing devices provide memories for the host 104.

It should be noted that the memory in this embodiment of this disclosure may be a dynamic random-access memory, a storage-level memory, or a high-bandwidth memory. The storage-level memory includes a non-volatile memory, a phase-change memory, or an Intel AEP Optane memory. This is not specifically limited herein.

Based on an architecture of the memory management system shown in FIG. 1, when a local memory of the host 104 is insufficient, the host 104 may request, from the network device 101 directly connected to the host 104, to use a remote memory, and the network device 101 may allocate the remote memory to the host 104 based on the request of the host 104 and a situation of the free memory in the memory pool.

In embodiments of this disclosure, the network device may allocate the remote memory to the host in a plurality of manners. Specifically, a plurality of embodiments are provided. The following describes an embodiment 1. In the embodiment 1, the free memory of the network device may be allocated to the host. For a specific execution process, refer to FIG. 2. The embodiment 1 of a memory management method provided in this disclosure includes the following steps.

201: A network device and a host establish a first connection.

The first connection is established between the network device and the host by using a network protocol. Optionally, the first connection may alternatively be established between the network device and the host by using a bus protocol. An RDMA protocol is used as an example. The host establishes a connection management (CM) link with the network device. Specifically, driven by a kernel of an operating system, the host establishes an RDMA CM link with the network device, and establishes the first connection between the network device and the host by using the CM link. Therefore, communication is established between the network device and the host, so that the network device and the host exchange information through the first connection. When receiving, through the first connection, a message sent by the host, the network device may parse the message, so that the network device terminates the message received through the first connection. Termination means that a message received by using a first protocol format is not further forwarded by using the first protocol format.

The network protocol includes a transmission control protocol (TCP) or the RDMA protocol. The bus protocol includes a high-speed serial computer extended bus standard (Peripheral Component Interconnect Express, PCIe) protocol, or a compute express link (CXL) protocol. A specific protocol type is not limited herein.

202: The network device and a target memory providing device establish a second connection.

The second connection is established between the network device and the target memory providing device by using a network protocol. Optionally, the second connection may alternatively be established between the network device and the target memory providing device by using a bus protocol. The RDMA protocol is used as an example. The host establishes a CM link with the network device. Specifically, the target memory providing device establishes an RDMA CM link with the network device, and establishes the first connection between the network device and the host by using the CM link, to establish communication between the network device and the host. The target memory providing device includes the memory providing devices 105 to 109. An example in which the memory providing device 101 connected to the network device 101 is a first memory providing device, the memory providing devices 106 and 107 connected to the network device 102 and the memory providing devices 108 and 109 connected to the network device 103 are second memory providing devices is subsequently used to describe the method shown in this embodiment of this disclosure.

It should be noted that, because there is no direct connection between the second memory providing device and the network device 101, the second connection can be established between the network device 101 and the second memory providing device only by using the network protocol. For a protocol used by the network devices 102 and 103 to establish a connection with the target memory providing device, refer to the network device 101.

The network device and the target memory providing device exchange information through the second connection. When receiving, through the second connection, a message sent by the target memory providing device, the network device parses the message, so that the network device terminates the message received through the second connection. Termination means that a message received by using a second protocol format is not further forwarded by using the second protocol format.

It should be noted that a sequence relationship between step 201 and step 202 is not limited.

203: The target memory providing device sends attribute information to the network device.

The target memory providing device sends the attribute information to the network device through the second connection. The attribute information includes a size of a free memory of the target memory providing device. When the free memory of the target memory providing device is occupied or released, the target memory providing device sends the attribute information to the network device.

204: The host sends a memory request message to the network device.

Memory data generated by an application of the host needs to be stored in a memory to ensure normal running of the application. If a local memory of the host cannot successfully store the memory data generated by the application, the host needs to store the memory data in a remote memory to ensure the normal running of the application.

When a local free memory of the host is less than or equal to a preset value, the host sends the memory request message to the network device by using the foregoing first connection, to request to use the remote memory.

It may be understood that, before sending the memory request message, in addition to determining whether the local free memory is less than or equal to the preset value, the host may further determine, during actual application, whether an application of a preset type exists and whether the application is in a running state. If the host determines that the application of the preset type exists and the application is in the running state, the host sends the memory request message to the network device to request to use the remote memory. A definition of the application of the preset type may be an application that needs to use the remote memory by default. A trigger condition for sending the memory request message by the host is not specifically limited.

The memory request message includes size information of a memory requested by the host. Optionally, if the host has a delay requirement on the requested remote memory, the memory request message further includes a first delay. The first delay represents delay information required by the host, and the delay information indicates that the host requests to store the memory data in the remote memory within preset duration.

205: The network device sends an indication message to the host.

Optional Case 1: The Host has No Delay Requirement.

When the host has no delay requirement on the requested remote memory, the network device determines whether a first free memory of the network device is greater than or equal to the remote memory requested by the host. If yes, the network device sends the indication message to the host through the first connection. The indication message includes an address of the network device, and the indication message may indicate the host to use the first free memory of the network device. If no, the network device continues to determine, based on the attribute information, whether the free memory of the target memory providing device is greater than or equal to the remote memory requested by the host.

It should be noted that the free memory described in this embodiment of this application is a memory that is not occupied by data.

Optional Case 2: The Host has a Delay Requirement.

When the host has the delay requirement on the requested remote memory, on a premise of meeting the size requirement in the optional case 1, the first free memory further needs to meet the delay requirement of the host. The network device estimates a delay that is generated when the first free memory is used by the host, to obtain a second delay. Then, the second delay is compared with the first delay carried in the memory request message. If the second delay is less than or equal to the first delay, it is determined that the first free memory meets the size requirement and the delay requirement. In this case, the network device sends the indication message in the optional case 1. If the second delay is greater than the first delay, the first free memory does not meet the delay requirement. In this case, the network device determines that the first free memory cannot be allocated. When the first free memory cannot be allocated, the network device determines whether the free memory of the target memory providing device meets the size requirement and the delay requirement.

It should be noted that, when estimating the second delay, specifically, the network device sends a detection packet to the host to detect the second delay. Alternatively, the network device obtains location information of the host based on initial configuration information of a memory management system, and obtains the second delay based on the location information of the host. A manner in which the network device estimates the second delay is not specifically limited.

206: The host uses the free memory of the network device based on the indication message.

After receiving the indication message, the host uses the first free memory of the network device based on address information of the network device in the indication message. Using an example in which the first connection is established between the host and the network device by using the RDMA protocol, the host interacts with the network device by using an RDMA send (RDMA SEND) operation. Specifically, the host sends an RDMA CM send only (RC Send Only) message to the network device, where the message is for applying for using the first free memory of the network device. After receiving the RC Send Only message, the network device sends an RDMA CM acknowledgment (RC Acknowledge) message to the host in response. If the network device determines that the first free memory can be allocated to the host, the network device sends an RC Send Only message to the host. The message carries a virtual address of the first free memory and a corresponding remote key (Rkey). The virtual address indicates a location of the first free memory, and the remote key indicates permission to use the first free memory. If the network device detects that the first free memory is occupied, it is determined that the first free memory cannot be allocated. In this case, an RC Acknowledge message indicates, to the host, that the first free memory is unavailable, and the host uses a virtual memory of a local solid-state drive.

After receiving the virtual address of the first free memory and the corresponding remote key, the host writes the memory data of the host into the first free memory by using the virtual address and the corresponding remote key by using an RDMA write (RDMA WRITE) operation. After storing the memory data, the network device sends an RC Acknowledge message to the host to notify the host that the memory data carried in a packet has been written into the first free memory.

If the host needs the memory data, the host may read the memory data from the network device by using an RDMA read (RDMA READ) operation.

It should be noted that the process in which the host uses the free memory in step 206 includes a process in which the host sends the memory data to the free memory and a process in which the host reads the memory data from the free memory. A definition of using is not specifically limited herein.

207: The host sends a memory release message to the network device.

If the host does not need to use a memory of the network device in a short time period, using the first connection established by using the RDMA protocol in step 206 as an example, the host sends the memory release message to the network device by using the RDMA READ operation, to notify the network device to release the memory occupied by the memory data.

If the host no longer needs to use the memory of the network device, the host terminates the first connection to the network device by using an RDMA CM link disconnection operation. The network device deletes a context corresponding to the host, where the context is a context for establishing the first connection between the host and the network device. After deleting the context, the network device releases the allocated first free memory.

208: The network device releases the first free memory based on the memory release message.

After receiving the memory release message from the host, the network device releases the memory occupied by the memory data of the host.

It should be noted that, in this embodiment, after the memory data of the host is stored in the free memory of the network device, the free memory is occupied by the memory data of the host. Whether the host needs the occupied free memory is not limited. Therefore, steps 207 and 208 are optional steps.

In this embodiment, when the host needs to use the remote memory, if the host has no delay requirement, when the free memory of the network device is greater than or equal to the remote memory that needs to be used by the host, in the free memory of the network device and the free memory of the target memory providing device, the network device preferentially allocates the free memory of the network device to the host. Because the network device and the host have a direct connection relationship, a delay generated when the host uses the free memory of the network device is smaller than a delay generated when the host uses the free memory of the target memory providing device, so that a delay generated when the host uses the remote memory is reduced. If the host has the delay requirement, on a premise that the free memory of the network device is greater than or equal to the remote memory that needs to be used by the host, the delay requirement of the host further needs to be met. In other words, the delay generated when the host uses the free memory of the network device needs to be less than or equal to a delay required by the host. Therefore, in this embodiment, the delay requirement of the host for using the remote memory can be met.

An embodiment 2 is described below. In the embodiment 1, the free memory of the network device may be allocated to the host. In this embodiment, the network device may allocate the free memory of the target memory providing device to the host. For a specific execution process, refer to FIG. 3. The embodiment 2 of a memory management method provided in this application includes the following steps.

301: A network device and a host establish a first connection.

302: The network device and a target memory providing device establish a second connection.

303: The target memory providing device sends attribute information to the network device.

304: The host sends a memory request message to the network device.

Figure 2:
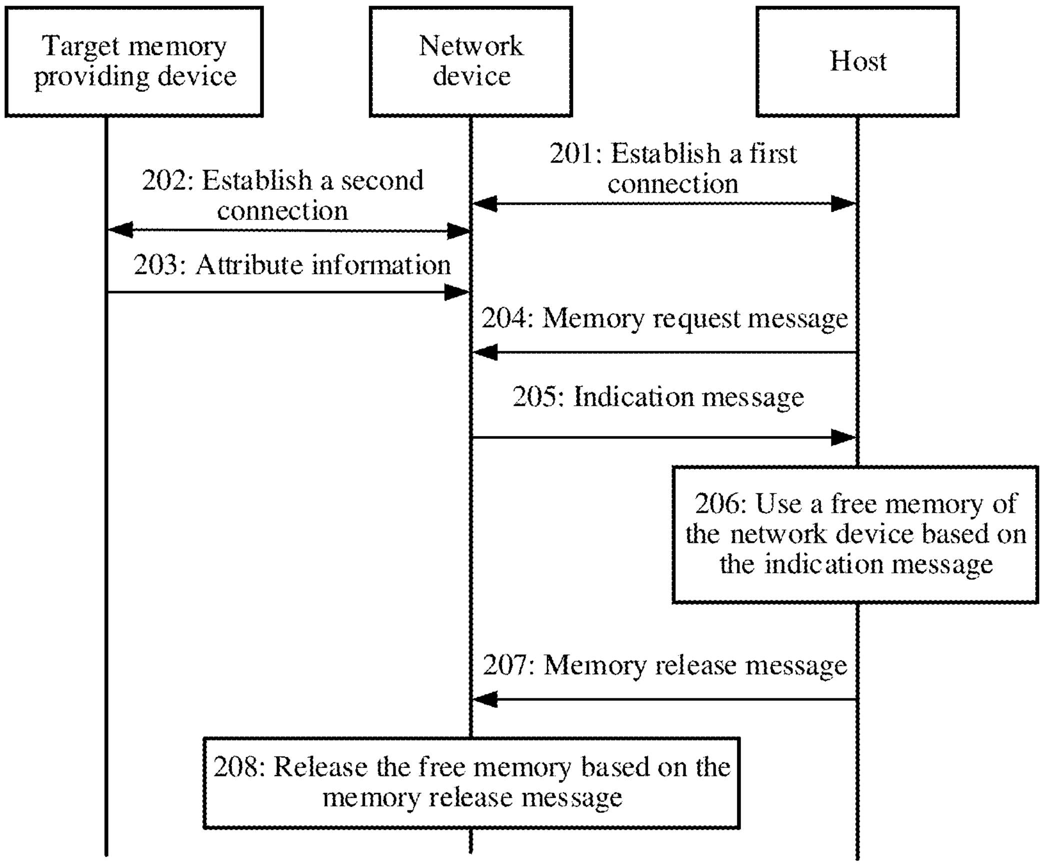
FIG. 2 is a schematic diagram of an example embodiment of a memory management method according to this disclosure.

In this embodiment, steps 301 to 304 are similar to steps 201 to 204 in the embodiment shown in FIG. 2.

305: The network device sends an indication message to the host.

Optional Case 1: The Host has No Delay Requirement.

If the host has no delay requirement on a requested remote memory, the network device allocates a free memory to the host based on a device priority. Specifically, the device priority is classified based on a delay. The network device 101 is used as an example. A delay generated when the host 104 uses a free memory of the network device 101 is recorded as A. A delay generated when the host 104 uses a free memory of the memory providing device 105 is recorded as B. A delay generated when the host 104 uses a free memory of the memory providing device 106 is recorded as C. Because the host 104 is directly connected to the network device 101, the memory providing device 105 is directly connected to the network device 101, and the memory providing device 106 is directly connected to a network device 102, the delay A<the delay B<the delay C. Therefore, relative to the host 104, the network device 101 has a highest priority, the memory providing device 105 has a second highest priority, and the memory providing device 106 has a lowest priority. A free memory of a device with a higher priority can be preferentially allocated to the host.

In conclusion, when the network device allocates a memory to the same host, the network device has a highest priority, a first memory providing device has a second highest priority, and a second memory providing device has a lowest priority.

The network device first determines whether a first free memory of the network device is greater than or equal to the remote memory requested by the host. If the first free memory is less than the remote memory requested by the host, the network device determines that the first free memory cannot be allocated. When the first free memory cannot be allocated, the network device obtains size information of a second free memory of the first memory providing device based on first attribute information that is of the first memory providing device and that is obtained in step 303, and determines whether the second free memory is greater than or equal to the remote memory requested by the host. If the second free memory is greater than or equal to the remote memory requested by the host, the network device sends the indication message to the host through the first connection. The indication message includes an address of the first memory providing device and an address of the second free memory, and the indication message may indicate the host to use the second free memory.

If the second free memory is less than the remote memory requested by the host, the network device determines that the second free memory cannot be allocated. When the second free memory cannot be allocated, the network device obtains size information of a third free memory of the second memory providing device based on second attribute information that is of the second memory providing device and that is obtained in step 303, and determines whether the third free memory is greater than or equal to the remote memory requested by the host. If the third free memory is greater than or equal to the remote memory requested by the host, the network device sends the indication message to the host through the first connection. The indication message includes an address of the second memory providing device and an address of the third free memory and the indication message may indicate the host to use the third free memory.

If the first free memory, the second free memory, and the third free memory are all less than the remote memory requested by the host, the host uses a virtual memory of a local solid-state drive.

Optional Case 2: The Host has a Delay Requirement.

In the optional case 2 based on the optional case 1, the host further has the delay requirement on the requested remote memory. In other words, on a premise that a free memory of the target memory providing device is greater than or equal to the remote memory requested by the host, the delay requirement of the host needs to be met. The network device estimates a delay to be generated when the host uses the free memory of the target memory providing device, to obtain a second delay, and then compares the second delay with a first delay carried in the memory request message. If the second delay is less than or equal to the first delay, it is determined that the free memory of the target memory providing device meets a size requirement and the delay requirement. In this case, the network device sends the indication message in the optional case 1. If the second delay is greater than the first delay, the free memory of the target memory providing device does not meet the delay requirement. In this case, the network device determines that the free memory of the target memory providing device cannot be allocated.

It should be noted that, when estimating the second delay, specifically, the network device sends a detection packet to the target memory providing device to detect the second delay. Optionally, the network device obtains location information of the target memory providing device based on initial configuration information of a memory management system, and obtains the second delay based on the location information of the target memory providing device. A manner in which the network device estimates the second delay is not specifically limited.

306: The host uses the free memory of the target memory providing device based on the indication message.

After receiving the indication message, the host uses the free memory of the target memory providing device based on address information of the target memory providing device in the indication message. Using an example in which a third connection is established between the host and the target memory providing device by using the RDMA protocol, the host interacts with the target memory providing device by using an RDMA SEND operation. Specifically, the host sends an RC Send Only message to the target memory providing device, where the message is for applying for using the free memory of the target memory providing device. After receiving the RC Send Only message, the target memory providing device sends an RC Acknowledge message to the host in response. If the target memory providing device determines that the free memory of the target memory providing device can be allocated to the host, the target memory providing device sends an RC Send Only message to the host. The message carries a virtual address of the free memory of the target memory providing device and a corresponding remote key. The virtual address indicates a location of the free memory of the target memory providing device, and the remote key indicates permission to use the free memory of the target memory providing device. If the target memory providing device detects that the free memory is occupied, it is determined that the free memory cannot be allocated. In this case, an RC Acknowledge message indicates, to the host, that the free memory is unavailable, and the host uses the virtual memory of the local solid-state drive.

After receiving the virtual address of the free memory of the target memory providing device and the corresponding remote key, the host writes memory data of the host into the free memory of the target memory providing device by using the virtual address and the corresponding remote key and by using an RDMA WRITE operation. After storing the memory data, the target memory providing device sends an RC Acknowledge message to the host to notify the host that the memory data carried in a packet has been written into the free memory of the target memory providing device.

If the host needs the memory data, the host may read the memory data from the free memory of the target memory providing device by using an RDMA READ operation.

It should be noted that the process in which the host uses the free memory in step 306 includes a process in which the host sends the memory data to the free memory and a process in which the host reads the memory data from the free memory. A definition of using is not specifically limited herein.

307: The host sends a memory release message to the target memory providing device.

308: The target memory providing device releases the free memory based on the memory release message.

In this embodiment, in comparison with steps 207 and 208 in the embodiment shown in FIG. 2, in steps 307 and 308, except that the network device is replaced with the target memory providing device and the third connection is established between the host and the target memory providing device, other steps are all similar.

In this embodiment, when the host needs to use the remote memory, if the host has no delay requirement, the network device may perform device priority division on the network device, the first memory providing device, and the second memory providing device based on a delay. The network device has a highest priority, the first memory providing device has a second highest priority, and the second memory providing device has a lowest priority. The network device may allocate a memory to the host based on the device priority, so that a delay generated when the host uses the free memory is as small as possible, and flexible allocation of the free memory is implemented. If the host has the delay requirement, on a premise that the free memory of the target memory providing device is greater than or equal to the remote memory that needs to be used by the host, the delay requirement of the host further needs to be met. In other words, the delay generated when the host uses the free memory of the target memory providing device needs to be less than or equal to a delay required by the host. Therefore, in this embodiment, the delay requirement of the host for using the remote memory can further be met.

Figure 4:
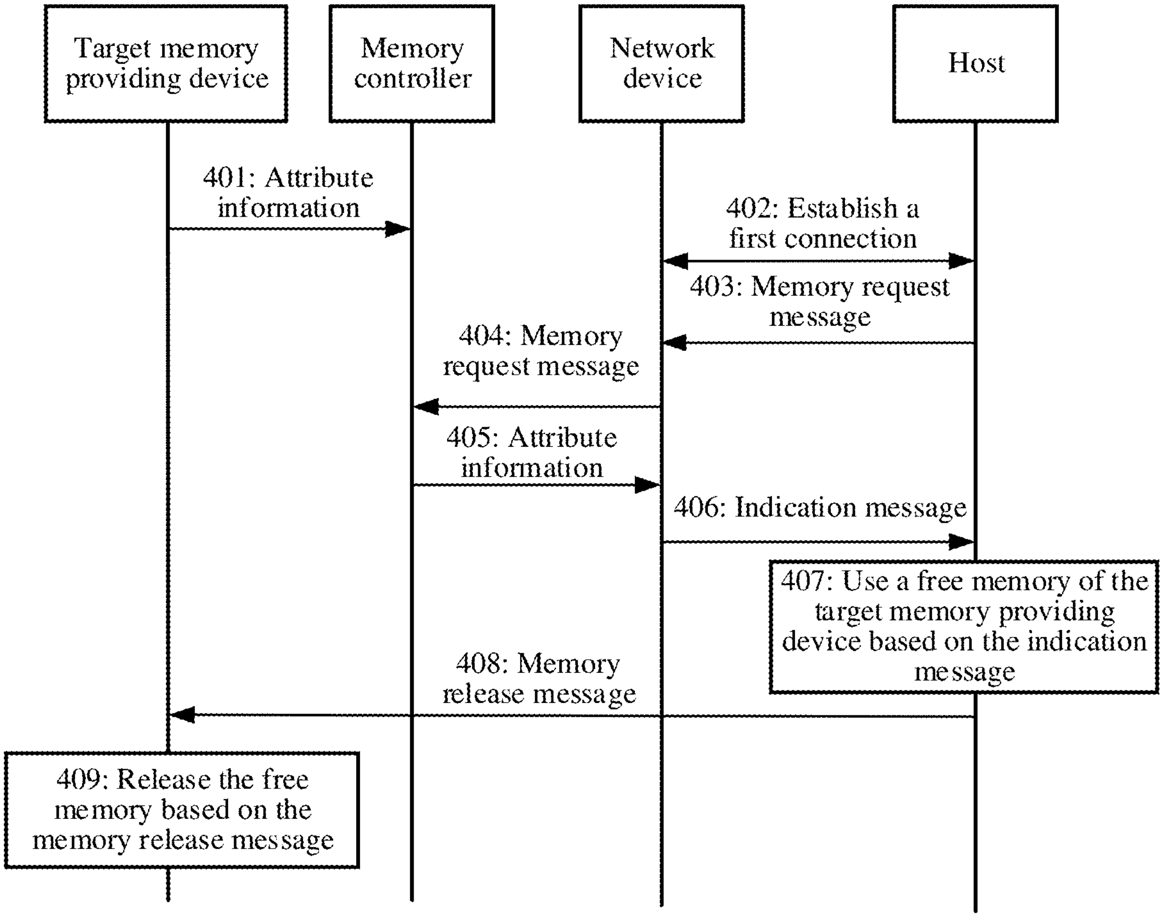
FIG. 4 is a schematic diagram of another example embodiment of a memory management method according to this disclosure.

An embodiment 3 is described below. In the embodiment 2, the network device allocates the free memory of the target memory providing device to the host in a manner of establishing a connection to the target memory providing device. In this embodiment, the network device may allocate the free memory of the target memory providing device to the host by using a memory controller. For a specific execution process, refer to FIG. 4. The embodiment 3 of a memory management method provided in this disclosure includes the following steps.

401: A target memory providing device sends attribute information to a memory controller.

In this embodiment, the target memory providing device may be a second memory providing device. The attribute information of the target memory providing device is reported to the memory controller via a network device. The attribute information includes a size of a free memory of the target memory providing device, an address of the target memory providing device and an address of the free memory of the target memory providing device. The network device is directly connected to the target memory providing device, the memory controller may be a device independent of the network device, and the memory controller and the network device belong to a same device cluster. Specifically, the memory controller is connected to a plurality of PoDs, and the network device is one of the plurality of PoDs. After the free memory of the target memory providing device is occupied or released, the target memory providing device reports the attribute information to the network device.

It should be noted that a sequence relationship between step 401 and other steps in this embodiment is not limited.

The memory controller may be deployed on a server, a management device, or another network device with a computing resource. This is not specifically limited herein.

402: The network device and a host establish a first connection.

403: The host sends a memory request message to the network device.

In this embodiment, steps 402 and 403 are similar to steps 203 and 204 in the embodiment shown in FIG. 2.

404: The network device forwards the memory request message to the memory controller.

After receiving the memory request message in step 403, the network device forwards the memory request message to the memory controller.

It may be understood that, during actual application, in addition to forwarding the memory request message to the memory controller via the network device, the host may alternatively directly send the memory request message to the memory controller. This is not specifically limited herein.

405: The memory controller sends the attribute information to the network device.

After receiving the memory request message in step 404, the memory controller selects a memory providing device based on the memory request message and the attribute information in step 401. Specifically, if the free memory of the target memory providing device meets a requirement in the memory request message, the memory controller sends the attribute information of the target memory providing device to the network device. The attribute information includes the address of the target memory providing device and the address of the free memory of the target memory providing device.

406: The network device sends an indication message to the host.

After receiving the attribute information in step 405, the network device obtains, based on the attribute information, the address of the target memory providing device and the address of the free memory of the target memory providing device in step 405, and sends the indication message to the host. The indication message carries the address of the target memory providing device and the address of the free memory of the target memory providing device.

407: The host uses the free memory of the target memory providing device based on the indication message.

408: The host sends a memory release message to the target memory providing device.

409: The target memory providing device releases the free memory based on the memory release message.

Figure 3:
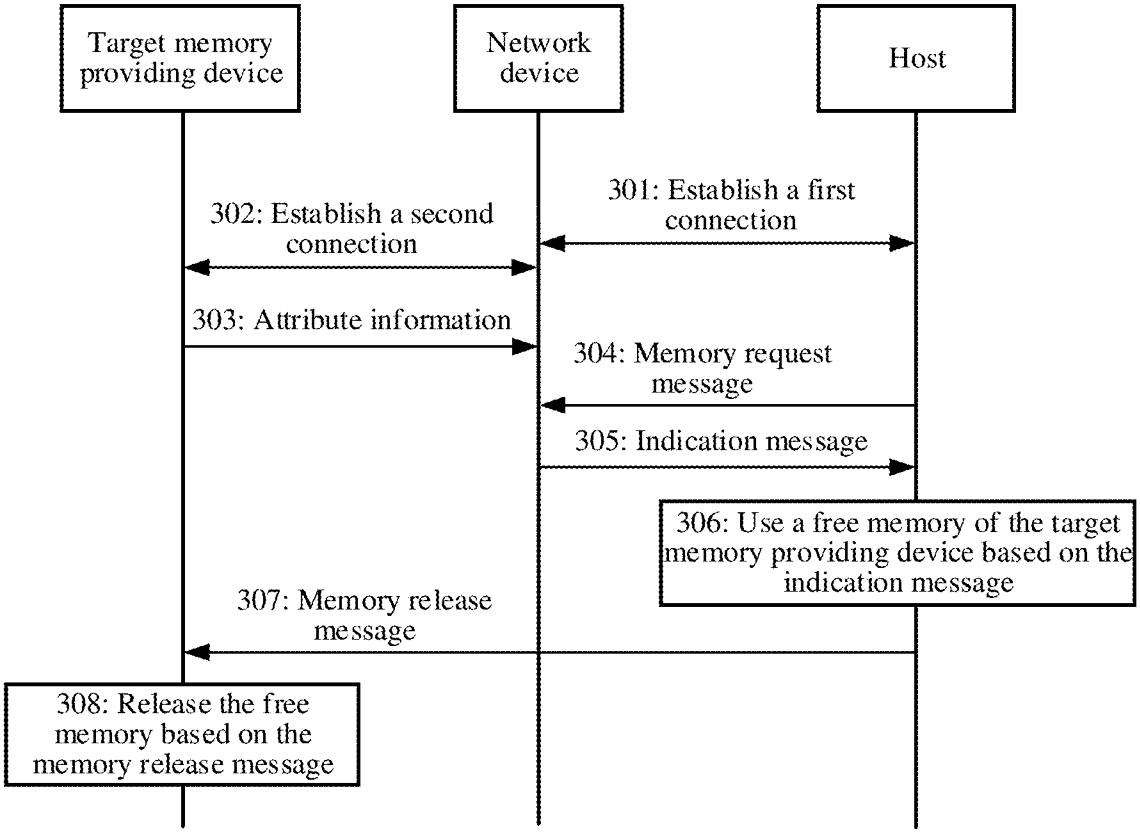
FIG. 3 is a schematic diagram of another example embodiment of a memory management method according to this disclosure.

In this embodiment, steps 407 to 409 are similar to steps 306 to 308 in the embodiment shown in FIG. 3.

In this embodiment, the target memory providing device may report the attribute information to the memory controller, and the network device may obtain the attribute information of the target memory providing device by using the memory controller, to indicate the host to use the free memory of the target memory providing device, so that processing load of the network device is reduced, and efficiency of memory allocation is improved.

Figure 5:
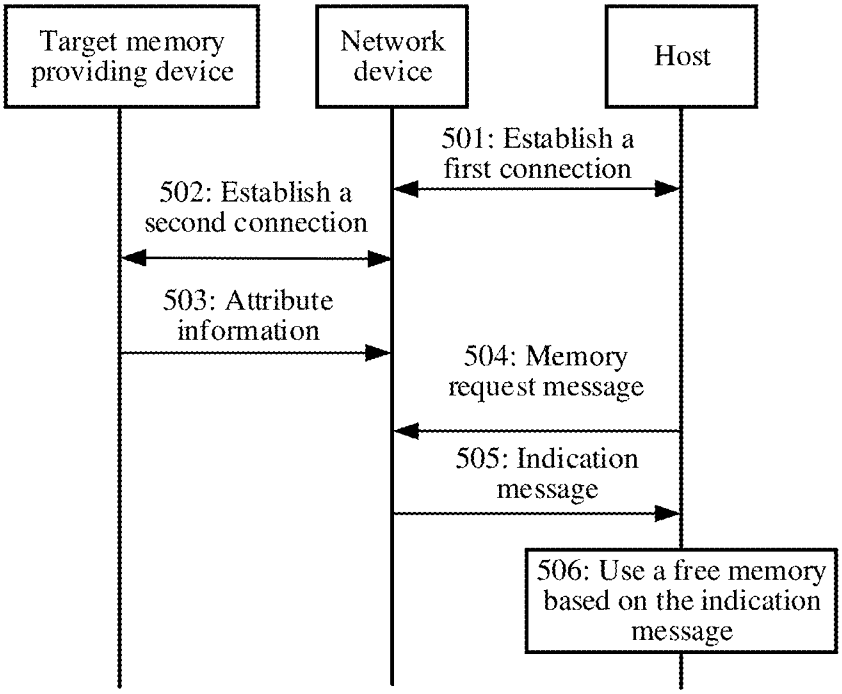
FIG. 5 is a schematic diagram of another example embodiment of a memory management method according to this disclosure.

An embodiment 4 is described below. In the embodiment 1, the free memory of the network device is allocated to the host. In the embodiment 2 and the embodiment 3, the free memory of the target memory providing device is allocated to the host. In this embodiment, the free memories of both the network device and the target memory providing device are greater than or equal to the remote memory requested by the host, and delays generated when the host uses the free memories of the two devices both meet the delay requirement of the host for requesting to use the remote memory. On this premise, the network device allocates a free memory provided by a device with a larger free memory. For a specific execution process, refer to FIG. 5. The embodiment 4 of a memory management method provided in this disclosure includes the following steps.

501: A network device and a host establish a first connection.

502: The network device and a target memory providing device establish a second connection.

503: The target memory providing device sends attribute information to the network device.

504: The host sends a memory request message to the network device.

In this embodiment, steps 501 to 504 are similar to steps 201 to 204 in the embodiment shown in FIG. 2.

505: The network device sends an indication message to the host.

Optional Case 1: The Host has No Delay Requirement.

When the host has no delay requirement on a requested remote memory, the network device performs a determining step 1: determining whether a first free memory of the network device is greater than or equal to the remote memory requested by the host. The network device performs a determining step 2: obtaining size information of a free memory of the target memory providing device based on the attribute information that is of the target memory providing device and that is obtained in step 503, and determining whether the free memory of the target memory providing device is greater than or equal to the remote memory requested by the host.

It should be noted that a sequence relationship between the determining step 1 and the determining step 2 is not limited.

If both the first free memory and the free memory of the target memory providing device are greater than or equal to the remote memory requested by the host, the network device determines that both the first free memory and the free memory of the target memory providing device can be allocated. The network device selects a device with a largest free memory from the network device and the target memory providing device, and allocates the free memory of the device to the host. The network device sends the indication message to the host through the first connection in step 501. The indication message includes an address of the device that provides the free memory and an address of the free memory, the indication message may indicate the host to use the free memory, and the free memory is selected by the network device in the foregoing manner.

Optional Case 2: The Host has a Delay Requirement.

If the host has the delay requirement on the requested remote memory, on a premise that the first free memory and the free memory of the target memory providing device meet a size requirement in the optional case 1, the delay requirement of the host further needs to be met. The network device estimates delays to be generated when the host uses the first free memory and the free memory of the target memory providing device, to obtain a second delay. Then, the second delay is compared with a first delay carried in the memory request message. If the second delay is less than or equal to the first delay, it is determined that both the first free memory and the free memory of the target memory providing device meet the size requirement and the delay requirement. In this case, the network device allocates the free memory to the host in the manner in the optional case 1. Optionally, the network device allocates the free memory to the host in another manner. Specifically, the network device selects a device with a largest delay from the network device and the target memory providing device, and allocates the free memory of the device to the host.

It should be noted that, for a process in which the network device estimates the second delay; refer to step 205 and step 305.

506: The host uses a free memory based on the indication message.

In this embodiment, step 506 is similar to step 206 in the embodiment shown in FIG. 2 and step 306 in the embodiment shown in FIG. 3.

In this embodiment, the free memories of both the network device and the target memory providing device are greater than or equal to the remote memory requested by the host, and the delays generated when the host uses the free memories of the two devices meet the delay requirement of the host requesting to use the remote memory. On this premise, the network device may allocate a free memory of a device with a largest free memory in the foregoing devices to the host, to ensure that the remote memory is properly configured as much as possible. Optionally, the network device may allocate a free memory of a device with a largest delay in the foregoing devices to the host, to reduce costs of memory allocation as much as possible.

Figure 6:
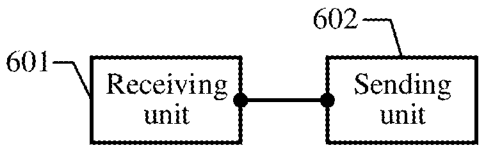
FIG. 6 is a schematic diagram of an example embodiment of a network device according to an embodiment of this disclosure.

The foregoing describes the memory management method in embodiments of this application, and the following describes the network device in embodiments of this application. Refer to FIG. 6. An embodiment of a network device in an embodiment of this application includes:

a receiving unit 601, configured to receive a memory request message from a host, where the memory request message is for requesting to use a remote memory; and a sending unit 602, configured to: when a free memory is greater than or equal to the remote memory; send an indication message to the host, where the indication message indicates the host to use the free memory, and the free memory includes a free memory of the network device and/or a free memory of a memory providing device.

In this embodiment of this disclosure, the sending unit 602 may allocate the free memory of the network device and/or the memory providing device to the host based on the memory request message received by the receiving unit 601, so that a memory available for allocation is increased.

Figure 7:
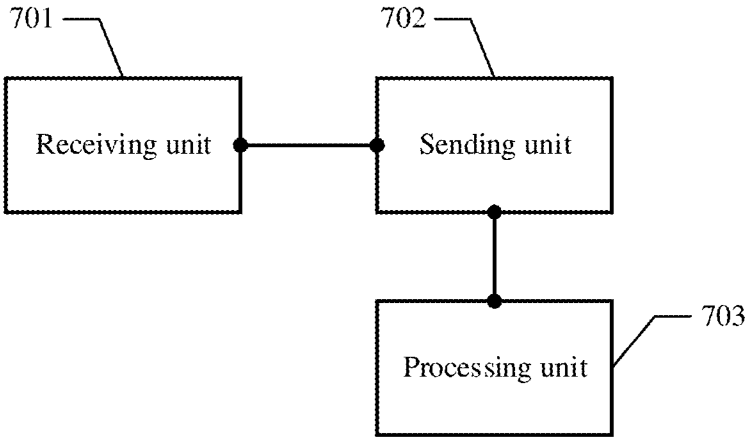
FIG. 7 is a schematic diagram of another example embodiment of a network device according to an embodiment of this disclosure.

The following describes in detail the network device in embodiments of this disclosure. Refer to FIG. 7. Another embodiment of a network device in an embodiment of this disclosure includes:

a receiving unit 701, configured to: receive a memory request message from a host, where the memory request message is for requesting to use a remote memory; receive third attribute information from a memory controller, where the third attribute information includes an address of a second memory providing device and an address of a third free memory; and receive first attribute information from a first memory providing device, where the first attribute information includes a size of a second free memory, and an indication message includes an address of the first memory providing device and an address of the second free memory; and receive the first attribute information from a first memory providing device, where the first attribute information includes a size of a second free memory, and an indication message includes an address of the first memory providing device and an address of the second free memory;

a sending unit 702, configured to: when a free memory is greater than or equal to the remote memory, send the indication message to the host, where the indication message indicates the host to use the free memory, the free memory includes a free memory of the network device and/or a free memory of a memory providing device, and when a second delay is less than or equal to a first delay, the indication message is sent to the host; and a processing unit 703, configured to: estimate the second delay generated when the host uses the free memory; establish a first connection, where the first connection is for implementing information exchange between the network device and the host, and the network device is configured to terminate a message received through the first connection; establish a second connection, where the second connection is for implementing information exchange between the network device and a target memory providing device, the target providing device is the first memory providing device or the second memory providing device, and the network device is configured to terminate a message received through the second connection; and forward the memory request message to the memory controller.

In this embodiment, units in the network device perform operations of the network device in embodiments shown in FIG. 2 to FIG. 5.

Figure 8:
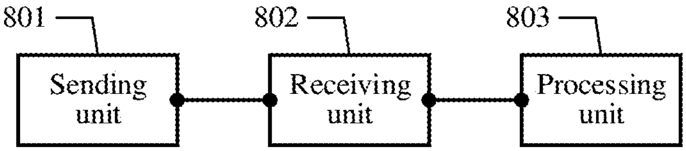
FIG. 8 is a schematic diagram of an example embodiment of a host according to an embodiment of this disclosure.

The foregoing describes the network device in embodiments of this disclosure, and the following describes the host in embodiments of this disclosure. Refer to FIG. 8. An embodiment of a host in an embodiment of this disclosure includes:

a sending unit 801, configured to send a memory request message to a network device, where the memory request message is for requesting to use a remote memory;

a receiving unit 802, configured to receive an indication message from the network device, where the indication message indicates the host to use a free memory, the free memory includes a free memory of the network device and/or a free memory of a memory providing device, and the free memory is greater than or equal to the remote memory; and a processing unit 803, configured to use the free memory based on the indication message.

In this embodiment of this disclosure, the processing unit 803 may use the free memory of the network device and/or the free memory of the memory providing device based on the indication message, so that a memory available for allocation is increased.

The following describes in detail the host in embodiments of this disclosure. Refer to FIG. 8. Another embodiment of a host in an embodiment of this disclosure includes:

a sending unit 801, configured to send a memory request message to a network device, where the memory request message is for requesting to use a remote memory;

a receiving unit 802, configured to receive an indication message from the network device, where the indication message indicates the host to use a free memory, the free memory includes a free memory of the network device and/or a free memory of a memory providing device, and the free memory is greater than or equal to the remote memory; and a processing unit 803, configured to use the free memory based on the indication message, and determine that a preset condition is met, where the preset condition is that a free memory of the host is less than or equal to a preset value.

In this embodiment, units in the host perform operations of the host in embodiments shown in FIG. 2 to FIG. 5.

Figure 9:
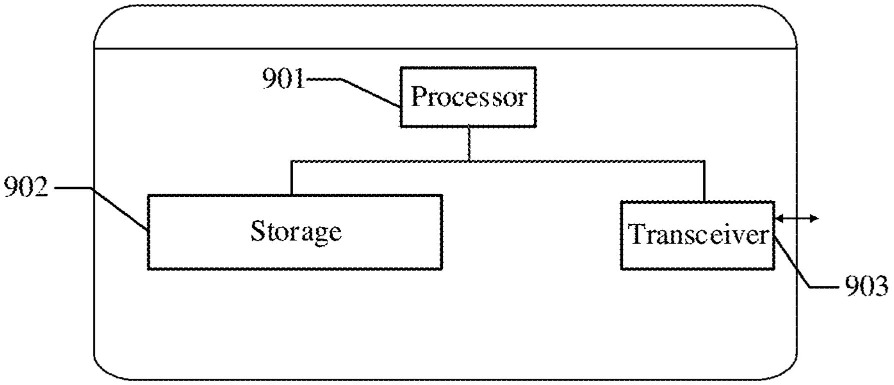
FIG. 9 is a schematic diagram of another example embodiment of a network device according to an embodiment of this disclosure.

Refer to FIG. 9 below. Another embodiment of a network device in an embodiment of this disclosure includes:

a processor 901, a storage 902, and a transceiver 903, where the processor 901 is separately connected to the storage 902 and the transceiver 903.

The processor 901 is configured to obtain instructions stored in the storage 902, to perform the method in embodiments shown in FIG. 2 to FIG. 5.

The processor 901 shown in this embodiment may be one or more field-programmable gate arrays (FPGAs), application-specific integrated chips (ASICs), system-on-chips (SoCs), central processing units (CPUs), network processors (NPs), digital signal processors (DSPs), microcontroller units (MCUs), programmable controllers (programmable logic devices, PLDs) or other integrated chips, or any combination of the foregoing chips or processors, or the like.

The network device has a memory interface configured to implement memory allocation shown in the foregoing method embodiments. The memory interface is integrated into a processor, or the processor and the memory interface are in a discrete architecture.

Figure 10:
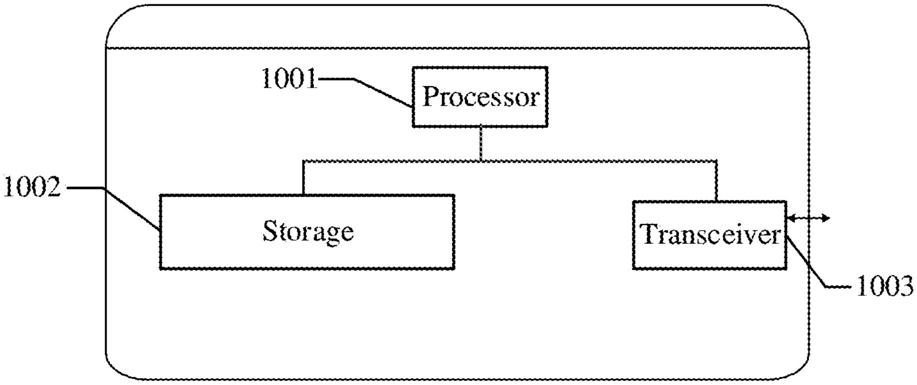
FIG. 10 is a schematic diagram of another example embodiment of a host according to an embodiment of this disclosure.

Refer to FIG. 10 below. Another embodiment of a host in an embodiment of this application includes:

a processor 1001, a storage 1002, and a transceiver 1003, where the processor 1001 is separately connected to the storage 1002 and the transceiver 1003.

The processor 1001 is configured to obtain instructions stored in the storage 1002, to perform the method in embodiments shown in FIG. 2 to FIG. 5.

An embodiment of this disclosure further provides a system. The system includes a network device and a host connected to the network device. The network device is configured to perform the method in embodiments shown in FIG. 2 to FIG. 5, and the host is configured to perform the method in embodiments shown in FIG. 2 to FIG. 5.

The embodiments described above are merely for describing technical solutions of the present technology, but are not for limiting the technical solutions. Although the present technology is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this disclosure.

What is claimed is:

1. A network device, comprising:
a processor; and
a memory storing program instructions which, when executed by the processor, cause the network device to:
receive a memory request message, for using a remote memory, from a host, wherein the memory request message carries a first delay;
estimate a second delay generated in association with the host using a free memory; and
in association with an amount of the free memory being greater than or equal to an amount of the remote memory and in association with the second delay being less than or equal to the first delay, send an indication message to the host, wherein
the indication message indicates the host to use the free memory, and
the free memory includes a free memory of the network device and/or a free memory of a memory providing device.

2. The network device according to claim 1, wherein
the free memory includes a first free memory of the network device and a second free memory of a first memory providing device,
the amount of the first free memory is greater than the amount of the remote memory, and
the indication message indicates the host to use the first free memory.

3. The network device according to claim 1, further comprising:
a switch or a data processing unit, wherein the host comprises a server, and the memory providing device comprises a server.

4. The network device according to claim 1, wherein the network device includes a network-level memory controller configured to perform memory management, and a communication device configured to execute a communication protocol between the network device and each of the host and the memory providing device.

5. The network device according to claim 1, wherein
the free memory includes a first free memory of the network device and a second free memory of a first memory providing device,
the amount of the first free memory is less than the amount of the remote memory,
the amount of the second free memory is greater than or equal to the amount of the remote memory,
the indication message indicates the host to use the second free memory, and
the first memory providing device is connected to the network device.

6. The network device according to claim 5, wherein the network device is further caused to:
receive first attribute information from the first memory providing device, wherein
the first attribute information includes a size of the second free memory, and
the indication message includes an address of the first memory providing device and an address of the second free memory.

7. The network device according to claim 1, wherein
the free memory includes a first free memory of the network device, a second free memory of a first memory providing device, and a third free memory of a second memory providing device,
the amount of the first free memory is less than the amount of the remote memory,
the amount of the second free memory is less than the amount of the remote memory,
the amount of the third free memory is greater than or equal to the amount of the remote memory,
the indication message indicates the host to use the third free memory,
the second memory providing device is connected to another network device, and
the first memory providing device is connected to the network device.

8. The network device according to claim 7, wherein the network device is further caused to:
forward the memory request message to a memory controller; and
receive third attribute information from the memory controller, wherein the third attribute information includes an address of the second memory providing device and an address of the third free memory.

9. The network device according to claim 7, wherein the network device is further caused to:
receive first attribute information from the first memory providing device, wherein the first attribute information includes a size of the second free memory; and
receive second attribute information from the second memory providing device, wherein the second attribute information includes a size of the third free memory, and the indication message includes an address of the second memory providing device and an address of the third free memory.

10. The network device according to claim 9, wherein the program instructions further cause the network device to:

establish a second connection for implementing information exchange between the network device and a target memory providing device, wherein the target providing device is the first memory providing device or the second memory providing device, and the network device is configured to terminate a message received through the second connection.

11. The network device according to claim 10, wherein the second connection is established based on any one of:

a remote direct memory access protocol, a transmission control protocol, a high-speed serial computer extended bus standard protocol, and a compute express link protocol.

12. The network device according to claim 1, wherein the network device is further caused to:

establish a first connection for implementing information exchange between the network device and the host, wherein the network device is configured to terminate a message received through the first connection.

13. The network device according to claim 12, wherein the first connection is established based on any one of:

a remote direct memory access protocol, a transmission control protocol, a high-speed serial computer extended bus standard protocol, and a compute express link protocol.

14. A host, comprising:

a processor; and a memory storing program instructions which, when executed by the processor, cause the host to:

send a memory request message, for requesting to use a remote memory, to a network device, wherein the memory request message carries a first delay;

receive an indication message from the network device, wherein the indication message indicates the host to use a free memory, and the free memory includes a free memory of the network device and/or a free memory of a memory providing device; and use the free memory based on the indication message, wherein the indication message indicates the host to use the free memory in association with an amount of the free memory being greater than or equal to an amount of the remote memory and in association with a second delay being less than or equal to the first delay.

15. The host according to claim 14, wherein the indication message indicates the host to use a first free memory of the network device, and the amount of the first free memory is greater than or equal to the amount of the remote memory, or the indication message indicates the host to use a second free memory of a first memory providing device, wherein the amount of the second free memory is greater than or equal to the amount of the remote memory.

16. The host according to claim 14, wherein the host is further caused to:

determine whether a preset condition is met, wherein the preset condition includes the amount of a free memory of the host being less than or equal to a preset value.

17. The host according to claim 14, further comprising:

a server, wherein the network device includes a switch or a data processing unit, and the memory providing device includes the server.

18. A memory management method, comprising:

receiving, by a network device, a memory request message, for requesting to use a remote memory, from a host; and in association with an amount of a free memory being greater than or equal to an amount of the remote memory, sending, by the network device, an indication message to the host, wherein the indication message indicates the host to use the free memory, the free memory comprises a free memory of the network device and/or a free memory of a memory providing device, the memory request message carries a first delay, before sending the indication message to the host, the method further comprises:

estimating, by the network device, a second delay generated when the host uses the free memory, and sending the indication message to the host comprises:

in association with the second delay being less than or equal to the first delay, sending, by the network device, the indication message to the host.

19. The memory management method according to claim 18, wherein the free memory includes a first free memory of the network device and a second free memory of a first memory providing device, the amount of the first free memory is greater than the amount of the remote memory, and the indication message indicates the host to use the first free memory.

20. The memory management method according to claim 18, wherein the free memory includes a first free memory of the network device and a second free memory of a first memory providing device, the amount of the first free memory is less than the amount of the remote memory, the amount of the second free memory is greater than or equal to the amount of the remote memory, the indication message indicates the host to use the second free memory, and the first memory providing device is connected to the network device.

* * * * *